March 4, 1958 E. C. WOODCOCK 2,825,823
ELECTRICAL IMPULSE DEVICES
Filed May 10, 1954 7 Sheets-Sheet 1

INVENTOR
Edward Cecil Woodcock
BY
ATTORNEY

March 4, 1958  E. C. WOODCOCK  2,825,823
ELECTRICAL IMPULSE DEVICES
Filed May 10, 1954  7 Sheets-Sheet 3

INVENTOR
Edward Cecil Woodcock
BY A. Odell
ATTORNEY

March 4, 1958

E. C. WOODCOCK 2,825,823

ELECTRICAL IMPULSE DEVICES

Filed May 10, 1954

INVENTOR
Edward Cecil Woodcock
BY A. J. O'dell
ATTORNEY

March 4, 1958 — E. C. WOODCOCK — 2,825,823
ELECTRICAL IMPULSE DEVICES
Filed May 10, 1954 — 7 Sheets-Sheet 5

INVENTOR
Edward Cecil Woodcock
BY A. F. Odell
ATTORNEY

March 4, 1958   E. C. WOODCOCK   2,825,823
ELECTRICAL IMPULSE DEVICES

Filed May 10, 1954   7 Sheets-Sheet 6

INVENTOR
Edward Cecil Woodcock
BY A. E. Odell
ATTORNEY

March 4, 1958 — E. C. WOODCOCK — 2,825,823
ELECTRICAL IMPULSE DEVICES

Filed May 10, 1954 — 7 Sheets-Sheet 7

INVENTOR
Edward Cecil Woodcock
BY A. P. Odell
ATTORNEY

United States Patent Office 2,825,823
Patented Mar. 4, 1958

2,825,823

ELECTRICAL IMPULSE DEVICES

Edward Cecil Woodcock, Pinner, England, assignor to Williamson Manufacturing Company Limited, London, England Application May 10, 1954, Serial No. 428,715

Claims priority, application Great Britain May 13, 1953

11 Claims. (Cl. 307—132)

This invention relates to devices for giving electrical impulses at constant intervals of time which are adjustable over a range of say a second or less up to say a minute or more. Such devices are used for setting other apparatus in action at intervals and an example is an automatic aircraft camera.

Devices used hitherto have included two types. In one of them an arm is clutched by a magnetic clutch to a member rotating at constant speed. At an adjustable point in the rotation the arm actuates a switch which switches off the clutch and the arm returns to its starting point under the action of a spring. There it switches on the clutch again. At one or other of the switches the electrical impulse is also given. In the other type, there are two members rotating at constant speeds in opposite directions. These have ratchet teeth and an arm carries a double pawl device so that it is clutched to one or other member and the limits of its motion are determined by a fixed stop and an adjustable stop which throw the double pawl device over from one to the other of the two positions. A switch is provided, actuated by the arm, which gives the electrical impulse. In the former type, towards the higher end of the range, the spring causes the arm to fly back rather violently and this sometimes leads to trouble. The second type, though avoiding springs and having a greater range than the first has the disadvantage that the adjustment can only be in steps corresponding to the tooth spacing on the discs and the change over sometimes leads to difficulty through the tooth just being missed.

The present invention combines the good features of both types and avoids the above disadvantages. According to the invention, two members are provided rotating in opposite directions and an arm is alternately clutched to the members by the aid of electromagnetic means under the control of switches actuated by the arm, at least one of the switches being adjustable in position to vary the angular movement of the arm between the points at which the change-over occurs, and a switch being provided actuated by the arm for giving the electrical impulse.

There may be two independent electromagnets, one associated with each rotating member, or there may be one electromagnet and a spring acting in opposition, the electromagnet causing the arm to be clutched to one member and the spring causing the arm to be clutched to the other member when the electromagnet is unexcited.

It would be possible to make the impulse switch separate from either of the end switches provided it was within the minimum angle of movement of the arm, but generally it is desirable to combine it with one or other of the clutch controlling switches. An impulse switch can be provided at both points, thus doubling the total range of intervals obtainable; both switches will be used for the shorter intervals but only one for the longer intervals.

It is usually convenient to provide only an impulse change-over switch at each end position i. e. a switch which is closed only as long as the arm actuates it. In that case, the clutches are controlled through a relay which holds itself on when the impulse is given. In the case of two electromagnets, the relay may be a double wound change-over relay with a hold-on contact for both positions. To enable very short intervals to be obtained, the two switches may have their arm-actuated members on opposite sides of the arm and the arm may carry a circumferentially elongated double ramp, which enables the switches to be mounted at an angular distance apart which is equal to the angle representing the desired interval plus the angular length of the ramp.

Two examples of the invention are illustrated in the accompanying drawings.

Figure 1:
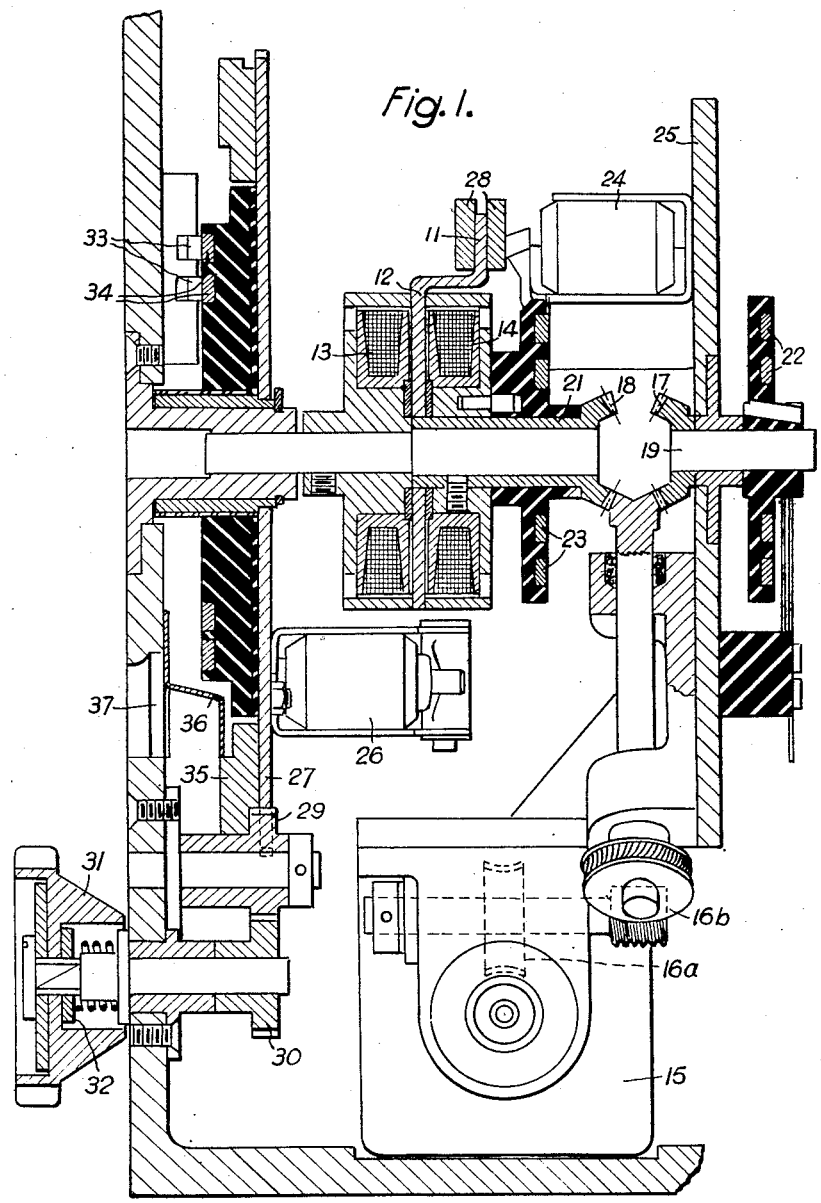
Figure 1 is an axial section of the first example.
Figure 2:
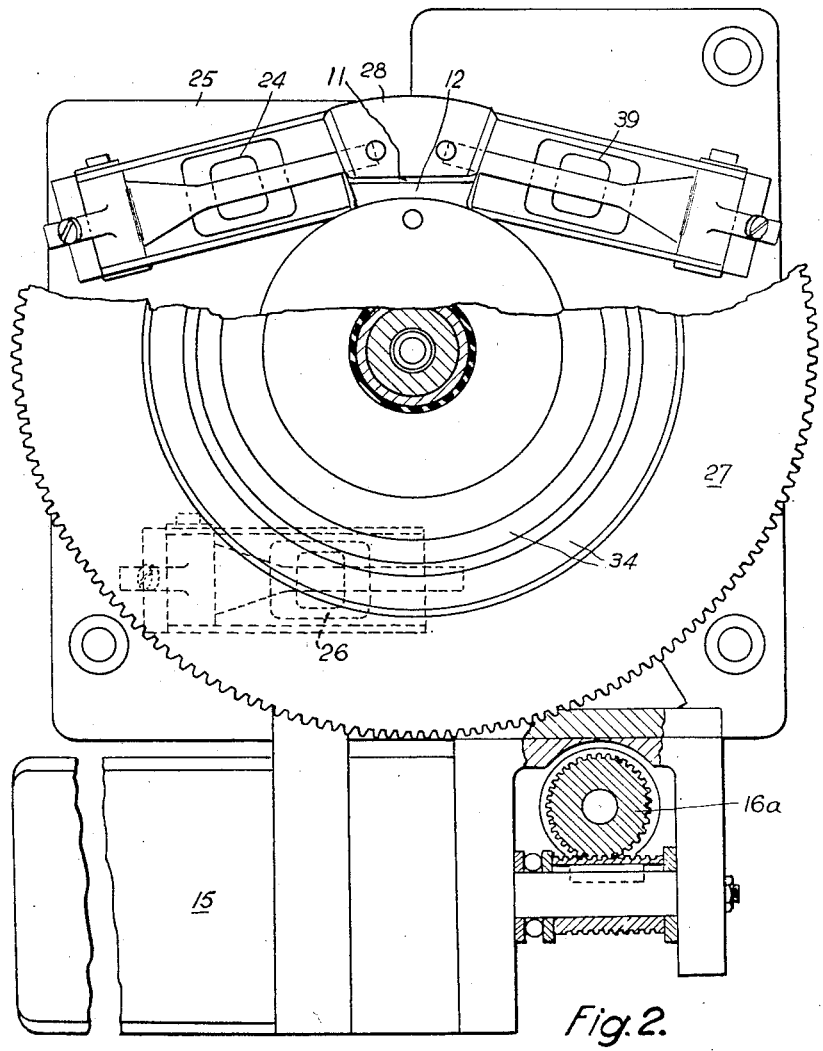
Figure 2 is a section on the line II, II of Figure 1 with certain parts broken away.

In the first example an arm 11 is conveniently formed on a disc 12 of soft iron or similar magnetic material and the two constantly rotating members are in the form of annular pot-shaped electromagnets 13, 14. The magnets are driven from a governed electric motor 15 through two stages of worm gearing 16a, 16b and through opposite bevel gears 17, 18, and shaft 19 of the gear 17 passing through the shaft 21 of the gear 18. The shaft 19 carries the magnet 13 and the shaft 20 carries the magnet 14. Only minute clearance for the disc 12 is necessary to enable it to be engaged by one magnet and yet be free of the other. The magnet windings are housed within the pots and in the illustrated example they rotate therewith. Slip rings 22 engaged by brushes not visible serve for connection to the winding of magnet 13 and slip rings 23 engaged by brushes not visible serve for connection to the winding of magnet 14. Alternatively, the windings could be stationary, being carried by stationary supports journalled on the shafts, only the disc 12 and the pots of the magnets 13, 14 rotating.

The excitation of the magnets is controlled by a fixed switch 24 mounted on a plate 25 and another switch 26 mounted on a rotatable disc 27. These switches are on opposite sides of the arm 11 and are of known normally open type, requiring only a small movement; actual engagement of their moving members is effected by a double ramp 28 carried by the arm 11. Mounting them on opposite sides in this way enables the moving switch to be brought as close as may be desired to the fixed switch without mutual interference.

To enable the disc 27 to be rotated to adjust the position of the switch 26, its periphery is toothed and a hand actuated wheel 30 can rotate it through an idle wheel 29. The shaft of the wheel 30 carries a hand knob 31 provided with a friction brake 32 so that it remains in adjusted position. Connection to the switch 26 is made through brushes 33 and slip rings 34. A member 35 secured to the back of the disc 27 bears an engraved scale with which co-operates an index 36 visible through a window 37.

Figure 3:
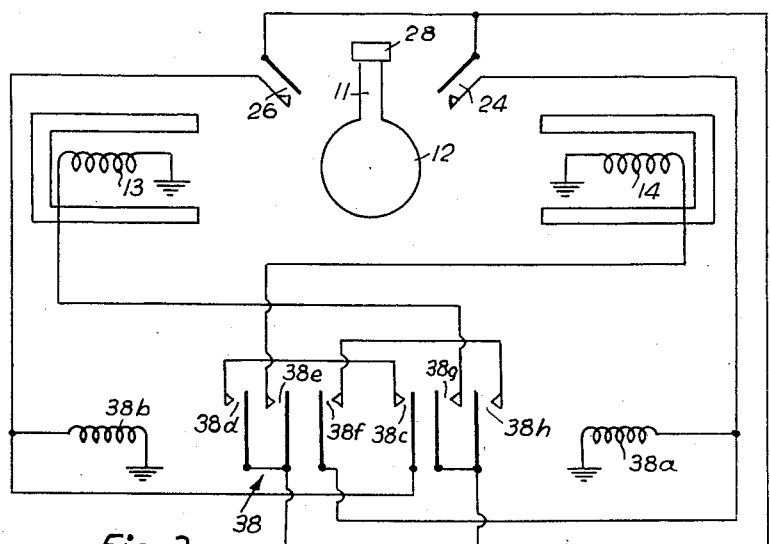
Figure 3 is a circuit diagram.
Figure 14:
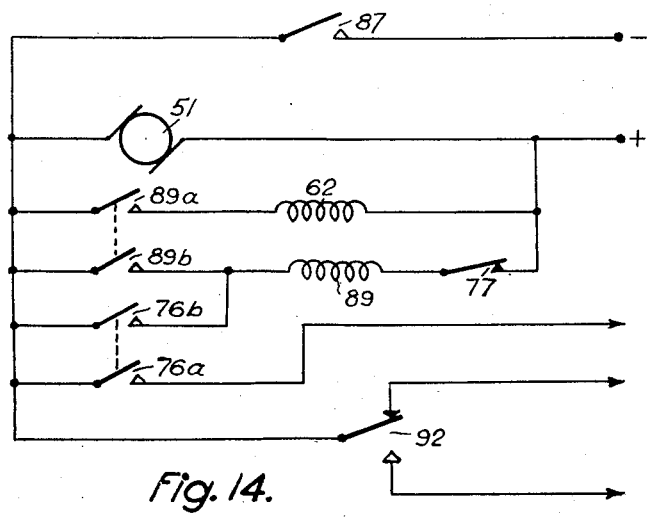
Figure 14 is a circuit diagram.
Figure 4:
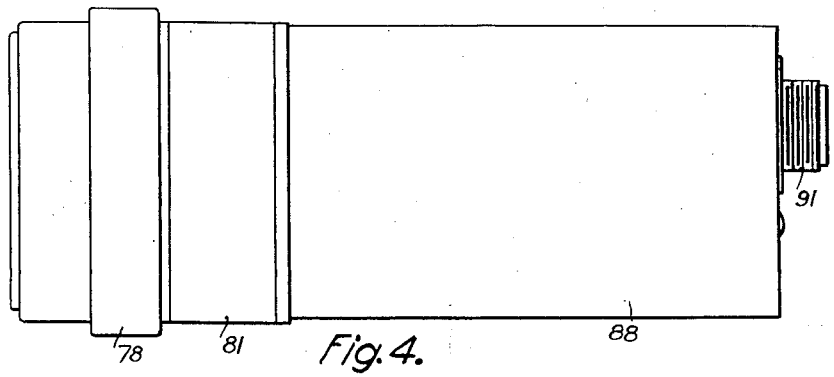
Figure 4 is a side view of the second example.

The circuit of the apparatus is controlled through a change-over relay shown in Figure 3, which has two windings, 38a, 38b, respectively controlling two sets of contacts 38c, 38g, 38h and 38d, 38e, 38f. When winding 38a is excited contact 38c is opened and contacts 38g and 38h are closed, while when winding 38b is excited contacts 38d and 38e are closed and 38f is opened. Respective sets of contacts are not linked together. The contact 38g controls a supply to the magnet winding 13 and the contact 38e controls the supply to the magnet winding 14. The two contacts 38f and 38h are in series and control a hold-on circuit for the relay winding 38b.

Assuming now that the motor 15 is rotating and that by a previous momentary manual operation of the switch 26 the winding 38b is excited so that contacts 38d, 38e and 38c are closed and contacts 38f, 38g and 38h are open. Then the relay winding 38b is held excited over contacts 38d, 38c and the magnet 14 is held excited over contact 38e while the hold-on circuit of winding 38a is open at contacts 38h, 38f, and the circuit of magnet winding 13 is open at contact 38g. Accordingly, the disc 12 is now carried round with the magnet 14 until the switch 24 is closed and an impulse is thereby given to the relay winding 38a. This opens the contact 38c in the hold-on circuit of the other relay winding 38b which therefore releases and so opens its own hold-on circuit 38d, breaks the supply to magnet 14 by releasing contact 38e and closes the contact 38f in the hold-on circuit of the winding 38a; at the same time the winding 38a closes the circuit of the magnet 13 at contact 38g and completes its own hold-on circuit at contact 38h. The disconnection of the winding of magnet 14 and the excitation of the winding of magnet 13 causes the disc 12 to leave the magnet 14 and to rotate with the magnet 13, thus carrying the arm 12 away from the switch 24. The switch 24 immediately opens but by then the relay has changed over and the winding 38a remains excited over the hold-on contacts 38f, 38h. The arm 11 now rotates with the magnet 13 until it engages and actuates the switch 26. This excites the winding 38b, which opens the hold-on contact 38f of the winding 38a which thus releases and the excitation of the magnets is changed over from 13 to 14. The disc 12 leaves the magnet 13 and is carried round by the magnet 14. The switch 26 is thereupon opened but the relay winding 38b remains excited through the hold-on contact 38c and hold-on contact 38d. When the arm reaches the switch 24 excitation of the relay is again changed over and the cycle repeats itself and so on. Incorporated in one or both of the switches 24, 26 is the impulse-giving switching means to be actuated at predetermined intervals.

Additional switches can be actuated by the arm 11. For example in the case of an aircraft camera it is usually desirable to give a signal a short time before the impulse which sets the camera in action is given. For this purpose another switch 39 can be provided in the path of the ramp 28 at a suitable angular interval ahead of the switch which gives the impulse and causes the clutches to change over. This additional switch is more conveniently located in fixed position near the fixed switch 24 and such a switch is indicated in the illustrated example at 39, mounted on the plate 25.

It will be understood that the switches 24, 26 and 39 can have any number of contacts according to the operations to be performed, apart from the changing over of the disc 12 from one magnet to the other.

In the example shown in Figures 4 to 14 an electromagnet and a spring are used in opposition. Here a constant speed, e. g. governed electric motor 51 through a pinion 52 and gearing 53, drives a shaft 54 and through further gearing 55, a side shaft 56 and gearing 57 drives a second shaft 58 co-axially with but in the opposite direction to the shaft 54. Fast to the shaft 54 are secured the centre member 59 and the outer member 61 of an annular electromagnet with winding 62. To make connection to the winding, slip rings 63 co-act with brushes 64 carried by an insulating ring 65.

A disc member 66 has an arm 67 projecting radially. The disc 66 is carried by a rotor 68 journalled in bores in the shafts 54, 58. The rotor carries a soft iron or like disc 69 to co-act with the magnet 59, 61 and another disc 71 to constitute a friction clutch with a disc 72 on the shaft 58 provided with a facing 73 of friction material.

A spring 74 housed in the member 59 acts through a ball 75 on the rotor 68 to engage the friction clutch when the magnet is de-energised.

The arm 67 co-acts with two switches. One, 76, is mounted in fixed position and the other, 77, is mounted on the ring 65 which can be rotated through the greater part of one revolution about the axis of the shafts 54, 58. To hold the ring 65 in adjusted position it is provided with a taper bored collar 78 co-acting with the taper surface 79 formed on an outer casing 81. A leaf spring 82 of corrugated form presses the ring to the left in Figure 5 thus causing the collar 78 to bind on the surface 79, but by pressing the ring 65 against the spring 82 the ring is released and can be rotated by hand. The adjusted position is indicated by a dial 83 co-acting with a fixed index disc 84 visible through a window 85.

The ring 65 can be turned to an off position in which a cam on the end face of the ring presses a rod 86 to open a main switch 87 (Figure 13), thereby cutting off the supply to the device, including the motor 51.

Figure 5:
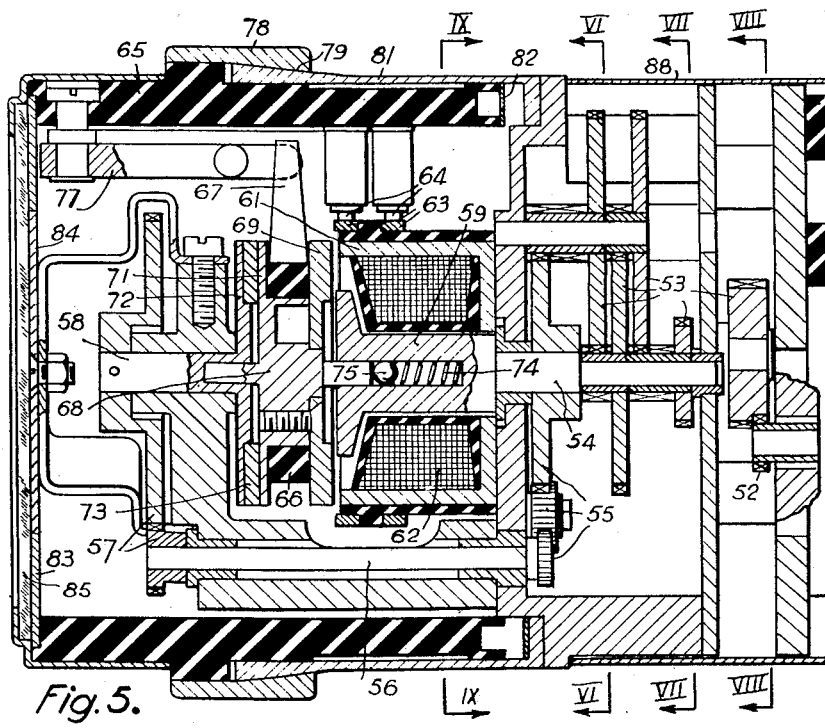
Figures 5 and 5a are an axial section of Figure 4 on a larger scale (shown in two parts).
Figure 5A:
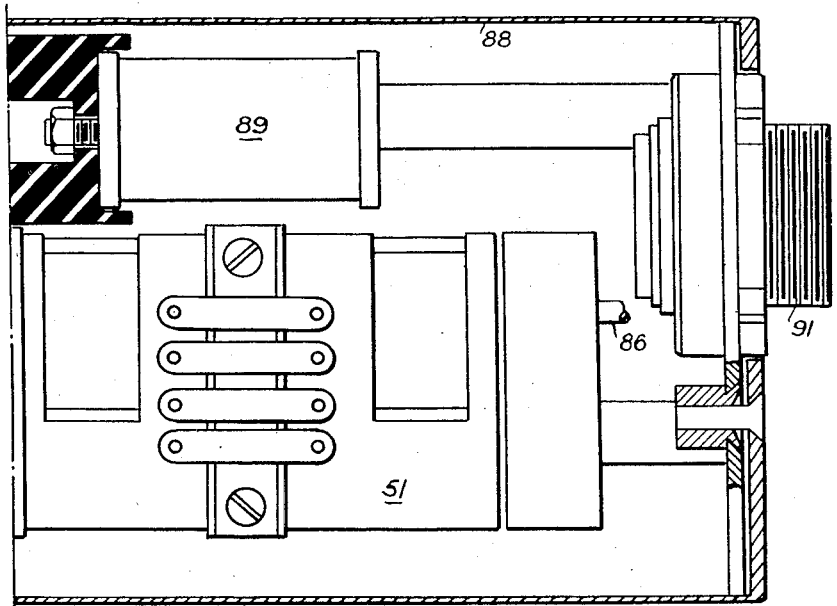
Figure 9:
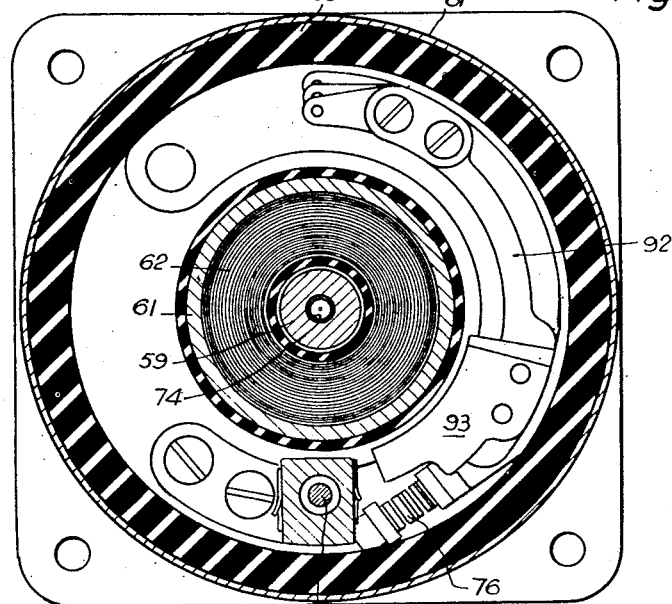
Figure 9 is a cross-section on the line IX, IX of Figure 5.
Figure 6:
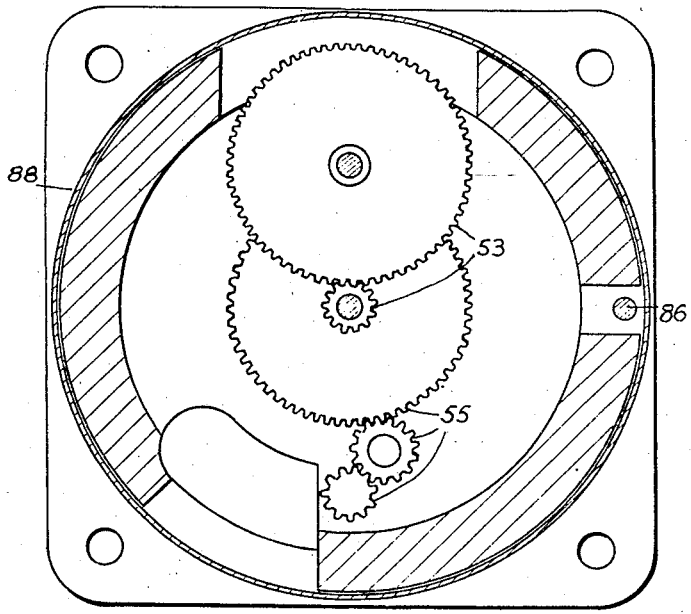
Figure 6 is a cross-section on the line VI, VI of Figure 5.
Figure 7:
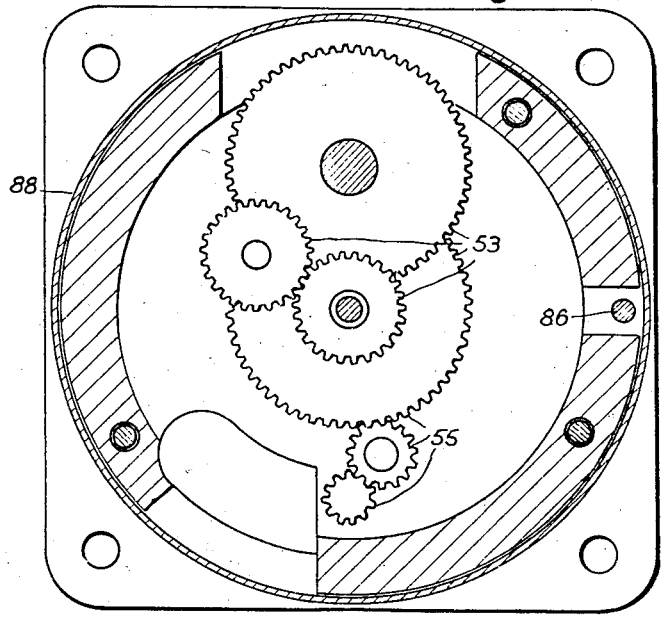
Figure 7 is a cross-section on the line VII, VII of Figure 5.
Figure 8:
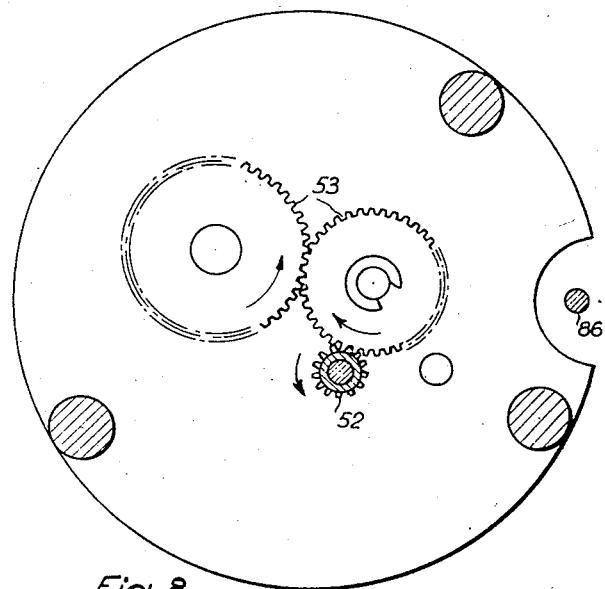
Figure 8 is a cross-section on the line VIII, VIII of Figure 5.
Figure 11:
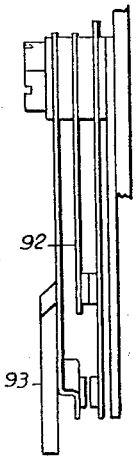
Figures 10, 11, 12 and 13 are details.
Figures 10, 13:
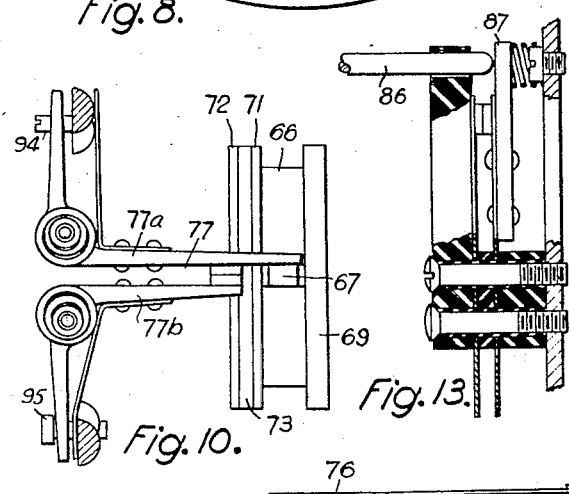
Figure 12:
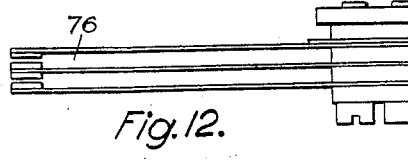

The rear part of the device is provided with a tubular enclosure 88 in which is housed the motor 51 and also a relay visible at 89, Figure 5. At the end is a screwed sleeve 91 by which a multi-contact connecting member at the end of a multi-core cable can be held in engaged position.

A further switch 92 is provided which carries a ramp 93 so as to be engaged by the arm 67 a little before the arm reaches the switch 76.

In this example the switch 76 has two pairs of contacts (marked 76a and 76b in Figure 14) both of which are closed by the action of the arm when it reaches the switch. The switch 77 has only one pair of contacts which are opened when the arm actuates it. These contacts are carried by two bell crank levers 77a, 77b pivoted to the ring 65 and spring urged towards one another. Screws 94, 95 which engage the biassing springs enable the switch to be adjusted.

Assuming now that the circuit is unenergised the rotor 68 will have been pushed to the left in Figure 5 by the spring 74 thus clutching the rotor to the shaft 58. If the switch 87 is now closed the motor 51 is started and through the friction clutch 71, 73 the arm 67 is rotated in a direction away from the switch 77. The contacts 76a, 76b are open, the relay 89 and windings 62 remain de-energised. The extension of the arm 67 first reaches the switch 92 which is closed as the arm passes, so switching off one remote indicator and switching on another. Shortly afterwards the arm reaches the switch 76. The contact 76a of this switch effects the remote operation to be controlled by the device, for example the actuation of an aircraft camera. The contact 76b causes the relay 89 to be excited. Although the switch 76 is only momentarily closed, once the relay has been excited it closes its own contacts, one of which 89b is a hold-on contact and the relay remains excited. Through the contact 89a the winding 62 is energised and the disc 69 will be clutched to the magnet 59, 61 and the disc 71 will be unclutched. Accordingly the disc 69 and with it the disc 66 will be rotated with the magnet 59, 61 in the opposite direction to carry the arm 67 towards the switch 77. When the switch 77 is reached by the arm it is opened and the relay is de-energised thus releasing contacts 89a, 89b. The release of contact 89a de-energises the winding 62 and the rotor 68 is again pushed to the left of Figure 5 by the spring 74 thus clutching the rotor to the shaft 58 so that its direction of rotation is again reversed. The cycle repeats itself so long as the supply remains switched on.

It will be understood that though only one switch contact 76a has been shown to effect a remote control by the device there could be any number of such contacts. It would also be possible to incorporate an additional contact or contacts in switch 77 which could also control remote operations.

I claim:

1. A device for giving a train of electrical impulses at constant but adjustable intervals of time, comprising two members constantly rotating in opposite directions, an arm, means including an electromagnet for clutching said arm to said two members alternately, two switches controlling said electromagnet and each when actuated causing the clutching of the arm to be changed over from the rotating member which has carried the arm towards the switch to the rotating member which carries the arm away from the switch, said switches being stationary in position and actuated by said arm so that the arm is carried to and fro without intermission between the positions at which it actuates the switches, at least one of the switches being independently adjustable in position to vary the angular distance between the positions of the arm at which it actuates the respective switches, and at least one impulse switch actuated by the arm in the course of each cycle of its movements.

2. A device for giving a train of electrical impulses at constant but adjustable intervals of time, comprising a first rotating member and a second rotating member constantly rotating in opposite directions, an arm, an electromagnet which when energised clutches said arm to said first rotating member, means for clutching said arm to said second rotating member immediately said electromagnet is de-energised, a first switch in stationary position actuated by said arm at a certain point in its path when it is clutched to and being carried along by said first rotating member, said first switch when actuated by the arm causing said electromagnet to be de-energised, thereby immediately changing over the clutching of the arm to the second rotating member, a second switch in a stationary position actuated by said arm at a certain point in its path when it is clutched to and being carried along by said second rotating member, said second switch when actuated by the arm causing said electromagnet to be energised thereby immediately changing over the clutching of the arm to the first rotating member, and so on, so that the arm is carried to and fro without intermission between the positions at which it actuates the respective switches, at least one of said switches being adjustable in position to vary the angular distance between the positions of the arm at which it actuates the respective switches, and at least one impulse switch in stationary position actuated by the arm in the course of its movements.

3. A device for giving a train of electrical impulses at constant but adjustable intervals of time comprising two members constantly rotating in opposite directions, an electromagnet associated with each rotating member, an arm, each said electromagnet when energised serving to clutch said arm to the rotating member with which it is associated, two switches in stationary position actuated by the arm, each switch when actuated serving to cause the de-energisation of the electromagnet associated with the rotating member which has brought the arm to a position to actuate the switch and to energise the other electromagnet, so that each time the arm actuates one of the switches the clutching of the arm is immediately changed over and in consequence the arm moves to and fro without intermission between the positions in which it actuates the respective switches, at least one of said switches being adjustable in position to vary the angular distance between the positions of the arm at which it actuates the respective switches, and at least one impulse switch in stationary position actuated by the arm in the course of its movements.

4. A device for giving a train of electrical impulses at constant but adjustable intervals of time comprising a first rotating member and a second rotating member constantly rotating in opposite directions, an arm, an electromagnet which when energised clutches said arm to said first rotating member, a friction clutch for clutching said arm to said second member, spring means engaging said friction clutch immediately said electromagnet is de-energised, a switch in stationary position actuated by said arm at a certain point in its path when it is clutched to said first rotating member, said switch when actuated by the arm causing said electromagnet to be de-energised and thus immediately changing over the clutching of the arm to said second rotating member, a second switch in stationary position actuated by said arm at a certain point in its path when it is clutched to said second rotating member, said second switch when actuated by the arm causing said electromagnet to be energised, and thus immediately changing over the clutching of the arm to said first rotating member, and so on, so that the arm moves to and fro without intermission between the positions in which it actuates the respective switches.

5. A device as set forth in claim 1 wherein said impulse switch is combined with one of said electromagnet controlling switches.

6. A device as set forth in claim 1 wherein an impulse-giving switch is combined with each of said electromagnet controlling switches.

7. A device as set forth in claim 1 in which each of said electromagnet controlling switches is an impulse switch, said device also comprising a relay controlled by said switches and controlling the supply to the electromagnet, said relay also comprising a hold-on circuit which holds the relay on after the impulse has been given and until the other of the two switches is actuated by the arm.

8. A device as set forth in claim 1 wherein said two electromagnet controlling switches are arranged on opposite sides of the arm, said arm carrying a circumferentially elongated double ramp which actuates the switches.

9. A device as set forth in claim 1 comprising two impulse switches, one combined with one of said electromagnet controlling switches and the other located to be actuated by the arm shortly before it reaches the combined switch.

10. A device for giving trains of electrical impulses at constant but adjustable intervals of time comprising a disc of magnetic material, two coaxial annular electromagnets one on each side of said disc and close enough to attract and clutch the disc when it is energised, means for constantly rotating the electromagnets in opposite directions, an arm projecting from said disc, a pair of switches one fixed and the other adjustable over a range of fixed positions about the axis of the electromagnets, said switches being located to be actuated by said arm so that when one electromagnet is engaged the switch which is next actuated changes over the excitation to the other electromagnet, thereby immediately changing over the clutching of the disc from the one electromagnet to the other so that the disc and arm move to and fro without intermission between the positions at which the arm actuates the respective switches, and at least one impulse switch in stationary position actuated by the arm in the course of each cycle of its movement.

11. A device for giving trains of electrical impulses at constant but adjustable intervals of time comprising an annular electromagnet, a friction clutch member coaxial with said electromagnet, a rotor journalled between and coaxially with said electromagnet and friction clutch member, means for constantly rotating said electromagnet and friction clutch member in opposite directions, a disc of magnetic material on said rotor facing said electromagnet whereby said rotor is clutched to said electromagnet when the latter is energised, a friction disc on said rotor facing said friction clutch member, spring means urging said rotor towards said friction clutch member whereby immediately said electromagnet is de-energised said friction disc is pressed against said friction clutch member thereby clutching said rotor to said friction clutch member, an arm carried by said rotor, a switch positioned to be actuated by the rotary movement of said arm when said rotor is clutched to said electromagnet, said switch when actuated by the arm causing the electromagnet to be de-energised, so that the clutching of the arm is immediately changed over to said friction clutch member and the movement of the rotor and arm is reversed, a second switch positioned to be actuated by the rotation of said arm when said rotor is clutched to said friction clutch member, said second switch when actuated by said arm causing said electromagnet to be energised, so that the clutching of the arm is immediately changed over to said electromagnet and the movement of the rotor and arm is again reversed, and so on, so that the arm moves to and fro without intermission between the positions at which it actuates the respective switches, the angular distance between said switches being adjustable, and at least one impulse switch actuated by said arm in the course of each cycle of its movement.

References Cited in the file of this patent

UNITED STATES PATENTS

| | | |
|---|---|---|
| 644,408 | Creveling | Feb. 27, 1900 |
| 1,426,557 | Ebeling et al. | Aug. 22, 1922 |
| 1,643,852 | Linstow | Sept. 27, 1927 |
| 1,853,225 | Rae | Apr. 12, 1932 |
| 1,883,163 | Van Voorhis | Oct. 18, 1932 |
| 1,913,826 | Blosser | June 13, 1933 |
| 2,139,482 | Atz | Dec. 6, 1938 |
| 2,325,860 | Kizaur | Aug. 3, 1943 |
| 2,514,836 | Buntzman | July 11, 1950 |
| 2,542,085 | Kelleith | Feb. 20, 1951 |

FOREIGN PATENTS

| | | |
|---|---|---|
| 514,716 | Great Britain | Nov. 15, 1939 |